(12) United States Patent
Wolf et al.

(10) Patent No.: US 7,331,733 B2
(45) Date of Patent: Feb. 19, 2008

(54) ROCKER PENDULUM WITH INTEGRATED BALL AND SOCKET JOINT

(75) Inventors: Georg Wolf, Osnabrück (DE); Frank Budde, Damme (DE)

(73) Assignee: ZF Lemforder Metallwaren AG, Stemwede-Dielinger (DE)

(*) Notice: Subject to any disclaimer, the term of this patent is extended or adjusted under 35 U.S.C. 154(b) by 0 days.

(21) Appl. No.: 10/895,147

(22) Filed: Jul. 20, 2004

(65) Prior Publication Data

US 2004/0258461 A1    Dec. 23, 2004

Related U.S. Application Data

(63) Continuation of application No. PCT/DE03/02294, filed on Jul. 9, 2003.

(30) Foreign Application Priority Data

Jul. 9, 2002 (DE) ................ 102 31 014

(51) Int. Cl.
F16C 11/06 (2006.01)

(52) U.S. Cl. .............. 403/135; 403/122; 403/133; 280/93.511

(58) Field of Classification Search ............ 403/122, 403/133, 134, 135, 128, 132; 280/93.511
See application file for complete search history.

(56) References Cited

U.S. PATENT DOCUMENTS

| | | | |
|---|---|---|---|
| 2,392,063 A * | 1/1946 | Riemann et al. ............ 403/128 |
| 2,829,904 A * | 4/1958 | Walter ........................ 403/141 |
| 4,874,649 A | 10/1989 | Daubenbüchel et al. |
| 5,009,538 A * | 4/1991 | Shirai et al. ................. 403/134 |
| 5,092,703 A * | 3/1992 | Kobayashi .................. 403/122 |
| 5,165,306 A * | 11/1992 | Hellon ........................ 74/588 |
| 5,213,008 A * | 5/1993 | Kanno et al. ............... 403/116 |
| 5,352,059 A | 10/1994 | Ueno et al. |
| 5,427,467 A * | 6/1995 | Sugiura ...................... 403/140 |
| 5,697,723 A * | 12/1997 | Wood ......................... 403/135 |
| 5,855,447 A | 1/1999 | Nemoto |
| 6,007,079 A | 12/1999 | Kincaid et al. |
| 6,254,114 B1 | 7/2001 | Pulling et al. |
| 6,547,267 B1 | 4/2003 | Heep |
| 6,691,366 B1 * | 2/2004 | Zimmer ................... 15/250.27 |
| 6,698,963 B1 | 3/2004 | Parker et al. |
| 6,886,235 B2 * | 5/2005 | Suzuki et al. ................. 29/558 |

FOREIGN PATENT DOCUMENTS

| | | |
|---|---|---|
| DE | 575 296 | 4/1933 |
| DE | 25 39 698 | 3/1977 |
| DE | 75 28 196 | 9/1981 |
| DE | 37 08 006 | 9/1988 |
| DE | 195 04 086 | 8/1996 |
| DE | 200 10 341 | 11/2000 |
| DE | 199 40 364 | 4/2001 |

(Continued)

Primary Examiner—Gregory J. Binda
Assistant Examiner—Michael P. Ferguson
(74) Attorney, Agent, or Firm—McGlew and Tuttle, P.C.

(57) ABSTRACT

A rocker pendulum for a motor vehicle, has an elongated, especially hollow basic body (1). The basic body (1, 11, 21, 31) has at least one section (1a, 11a, 21a, 31a), which forms or has a bearing shell of a ball and socket joint.

22 Claims, 4 Drawing Sheets

FOREIGN PATENT DOCUMENTS

| | | |
|---|---|---|
| EP | 0 726 177 | 8/1996 |
| EP | 0 832 769 | 4/1998 |
| EP | 0 925 964 | 6/1999 |
| EP | 1 217 233 | 6/2002 |
| FR | 2 815 387 | 4/2002 |

* cited by examiner

ROCKER PENDULUM WITH INTEGRATED BALL AND SOCKET JOINT

CROSS REFERENCE TO RELATED APPLICATION

This is a continuation of and claims the benefit (35 U.S.C. §120 and 365(c)) of copending International Application PCT/DE 2003/002294 of Jul. 9, 2003, which designated inter alia the United States and which claims the priority of German Application of DE 102 31 0144.9 of Jul. 9, 2002. The entire contents of each application is hereby incorporated by reference in its entirety.

FIELD OF THE INVENTION

The present invention pertains to a rocker pendulum for a motor vehicle, having an elongated, especially hollow basic body.

BACKGROUND OF THE INVENTION

Rocker pendulums are used in motor vehicles to connect the stabilizer and the pivot bearing or the axle of a motor vehicle. Rocker pendulums are usually characterized by high dynamic loadability with a simultaneous corrosion resistance. Rocker pendulums used in passenger cars are now made of metal or plastic. Rocker pendulums made of plastic advantageously have a low weight. However, one problem arises in the case of injection-molded rocker pendulums from the requirements concerning buckling forces.

There are various embodiments of rocker pendulums. In order to guarantee the mobility of the components in relation to one another, the rocker pendulums have, e.g., ball pins or ball and socket joints on one side or on both sides. To ensure the good function of these joints, the individual components, such as ball sockets and ball pins, must be machined with very high precision. In addition, a sealing system in the form of, e.g., a sealing bellows is necessary in order to protect the ball and socket joints, which are generally lubricated, from dirt and corrosion.

The drawback of the prior-art rocker pendulums is that they comprise a disproportionately large number of parts, as a result of which the manufacturing and assembly efforts are unusually high.

SUMMARY OF THE INVENTION

The object of the present invention is to provide a rocker pendulum, which has a simple design, comprises only a small number of parts and can thus be mounted easily.

This object is accomplished according to the present invention by a rocker pendulum for a motor vehicle, having a elongated, especially hollow basic body having at least one section that forms or has a bearing shell of a ball and socket joint.

The basic idea of the present invention is that the rocker pendulum comprises an essentially elongated basic body, which has at least one bearing shell for a ball and socket joint. The bearing shell itself may be formed by the outer wall of the basic body, and the outer wall has a corresponding recess in this case, which advantageously has a spherical shape.

In another embodiment, the basic body may have a recess into which a bearing shell for a ball and socket joint can be inserted. The bearing shell can be connected according to this embodiment with the basic body in any desired manner. The bearing shell is advantageously connected with the basic body by locking, bonding or welding to the basic body.

The basic body may advantageously be an injection molded part or an extruded section. To attain a higher rigidity, the area of the basic body that carries or forms the bearing shell may be reinforced, because this area or section is subject to increased mechanical loads. The reinforcement may be performed, for example, by fiber reinforcement or other additional material components. Additional webs or the like may possibly also be provided to increase the rigidity.

If the basic body comprises an essentially tubular section, it is possible to compress, e.g., one end or both ends of the tube, so that the end areas have a smaller diameter than the middle section of the basic body. It is also conceivable that the diameter of the end areas is not changed, and the middle area of the basic body is, in contrast, widened, e.g., according to the blow molding process. The rigidity of the basic body can be advantageously increased as a result of this as well.

Depending on the requirement, at least one end area of the basic body may advantageously form a bearing shell of a ball and socket joint. If the rocker pendulum must be mounted by means of ball and socket joints mounted on both sides, both free end areas of the basic body advantageously have corresponding bearing shells.

To protect the ball and socket joint against dirt and external mechanical effects, it is advantageous to provide a sealing bellows, which can be fastened to the basic body or an inserted bearing shell. This sealing bellows can be held at the basic body or the bearing shell by tension. However, it is also possible to provide an additional straining ring to fasten the sealing bellows.

It is likewise a subject of the present invention that a fastening element, via which additional vehicle components or joints can be accommodated, can be arranged at a free end of the basic body. Thus, this fastening element may be fastened to the basic body, e.g., by locking. The basic body advantageously has setbacks for this purpose on its inner or outer wall, which cooperate with corresponding projections and bring about a locking connection.

Various embodiments of the idea of the present invention will be explained in greater detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1a is a sectional view A-A according to FIG. 1;

DESCRIPTION OF THE PREFERRED EMBODIMENTS

Figure 1:
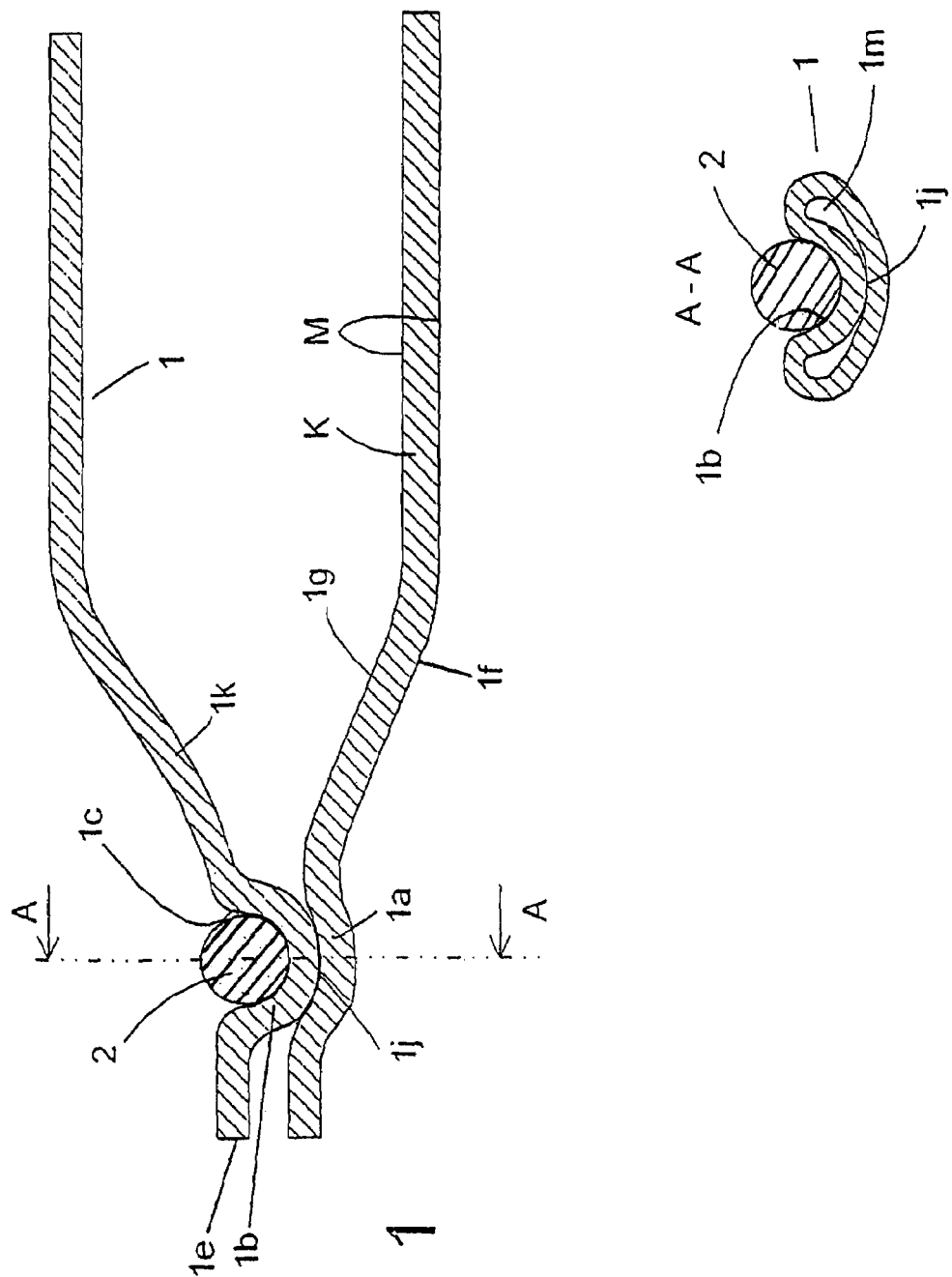
FIG. 1 is a cross-sectional view of a first embodiment of a rocker pendulum according to the present invention.

FIG. 1 shows a cross-sectional view of an end area of a rocker pendulum comprising a basic body 1 as well as the free end 1a thereof, which forms the bearing shell 1b for a ball 2 of a ball and socket joint. The basic body 1 is an elongated part made especially of a plastic as its material and may have any desired cross-sectional shape. The basic body shown as an example in FIG. 1 and FIG. 1a has an essentially hollow and round cross section, and at least one end of the basic body 1 has a smaller diameter than the middle area of the basic body. However, the diameter ratio may be as desired; thus, a constant diameter over the entire length of the rocker pendulum is also possible. The walls of the basic body 1 are bulged in area 1a such that, on the one hand, a bearing shell 1b is formed, and, on the other hand, the opposite wall is bulged such that it abuts with its inner wall 1g against the inner wall 1g of the area forming the bearing shell section 1b and thus it favorably affects the strength and the stability of the basic body 1. The bearing shell section 1b has a bottom area 1j (bulge bottom) and an annular edge 1c. The ball pivot made integrally in one piece with the joint ball 2 is not shown. Starting from the middle area, the basic body 1 tapers in the area 1k toward the section 1a. The front side 1e of the basic body 1 maybe sealingly closed, e.g., by means of a plug, not shown, or it my be closed by means of a tool, e.g., by pinching off. As is apparent from FIG. 1a, the inner walls 1g of the basic body 1 are in contact with one another in the bottom area 1j or the section plane A-A, as a result of which the interior space 1m closed almost completely in the area of the bearing shell 1b. The shape 1b is calotte shell-shape, so that the joint ball 2 is in contact with the outer wall 1f of the basic body 1 over a large area.

To guarantee good tribological properties, the basic body itself comprises a core component K and a component forming the jacket surface M. The basic body may be either an injection molded part or a part manufactured according to the blow molding process. If no plastic is used, it is also possible for the basic body to consist of a metal, in which case a lubricant is used especially in the area of the bulge 1b as a bearing shell. Furthermore, it is possible that the basic body 1 manufactured from plastic is reinforced by means of a metal insert, e.g., a metal tube, which is surrounded by the plastic especially completely.

Figure 2:
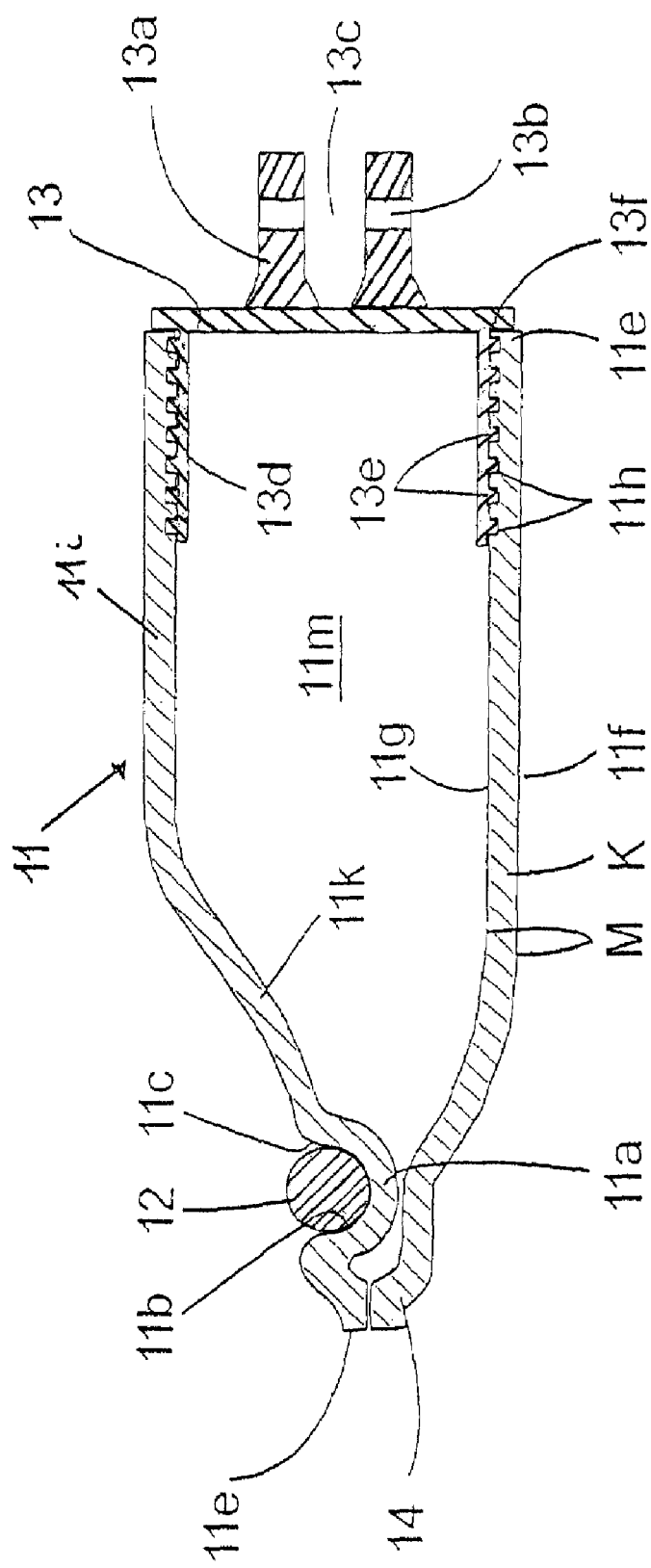
FIG. 2 is a sectional view through a second possible embodiment of a rocker pendulum according to the present invention.

FIG. 2 shows a cross-sectional view of a second possible embodiment of a rocker pendulum. The basic body 11 has a circular cross section at least in the middle area 11i. However, any desired cross-sectional shape may be selected for the basic body 11, which also applies, of course, to all other embodiments shown and explained as examples. The basic body 11 is a hollow component, whose cavity 11m is open on the front sides 11e. A fastening element 13 is fastened at the right-hand end of the basic body 11 by means of a locking mechanism 13e, the locking mechanisms or projections 13e being arranged at a projection 13d engaging the cavity 11m of the basic body 11. With its collar-shaped wall 13f, the fastening element 13 is especially sealingly in contact with the front side 11e of the basic body 11. Holding devices 13a are arranged at or made in one piece with the side of the collar 13f, which side faces away from the projection 13d, the said holding devices 13a having window-like openings and arranged at spaced locations from one another and forming an intermediate space 13c, which is used to accommodate a motor vehicle component. The rocker pendulum can be fastened, e.g., to the vehicle body by means of the fastening elements 13 and its projections 13a.

The other end of the basic body 11 is shaped such that it forms a bearing shell 11b for a joint ball 12. The section 11a, which forms the bearing shell 11b, has a smaller diameter than the middle area 11i of the basic body 11. The opening of the cavity 11m is sealingly pinched off by means of a tool in the area 11a.

Figure 3:
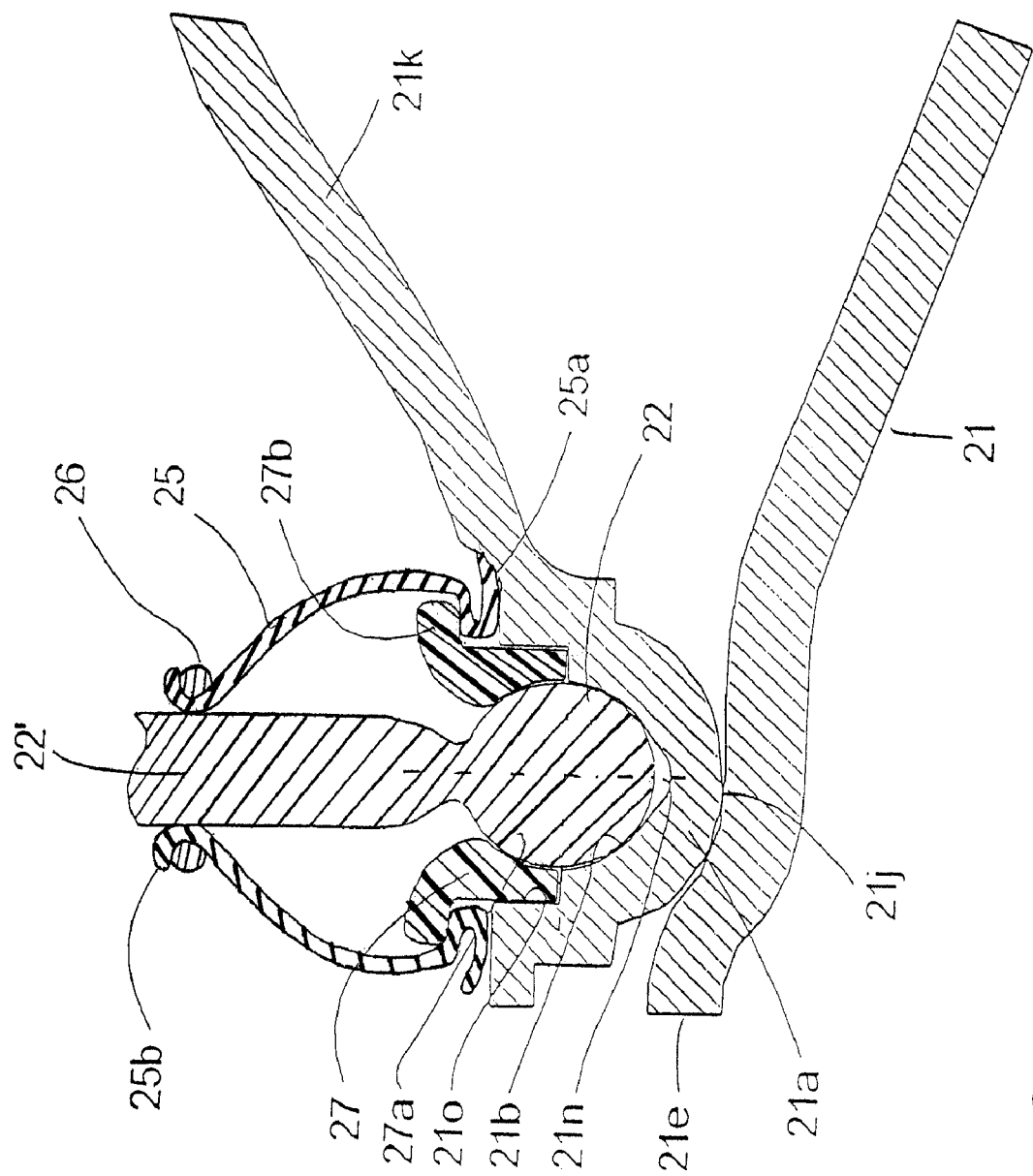
FIG. 3 is a cross-sectional view of a third possible embodiment of a rocker pendulum according to the present invention.

FIG. 3 shows a third possible embodiment of a rocker pendulum according to the present invention. Only the end area 21a of the basic body 21, which said end area forms the bearing shell, is shown in some sections with the ball pivot 22' inserted and with the joint ball 22 formed integrally thereon. The basic body 21 tapers in the area 21k toward the area 21a. One side of the wall of the basic body 21 is made calotte shell-shaped on its outer side and forms the bearing shell 21b. A depression 21n, which forms a grease pocket, in which grease is stored for lubricating the ball and socket joint, is formed in the center of the bearing shell 21b. The bearing shell 21b surrounds the joint ball 22 at an angle smaller than or equal to 180°, so that the joint ball 23 can be inserted into the bearing shell 21b without problems. An additional closing element 27 is inserted via the ball pivot 22' and the joint ball 22 into another opening 21o, which adjoins the recess for the bearing shell 21b, and it is bonded or welded, e.g., to the outer wall of the basic body 21. As a result, the joint ball 22 is held securely at the basic body 21. An additional sealing bellows 25 is clamped with its end 25a into a circular setback of the closing element 27, which is formed by a collar 27b, as a result of which the sealing bellows 25 is held securely and captively because of its intrinsic stress. The end 25a of the sealing bellows may optionally also be secured with a straining ring, not shown, at the basic body 21 or the closing element 27. The other end 25b of the sealing bellows 25 extends around the ball pivot 22', and pressure is applied to it with a straining ring 26 against the latter. The wall of the basic body 21 is compressed or shaped in the area 21a such that the inner walls of the basic body 21 are in contact with one another in the area 21j.

Figure 4:
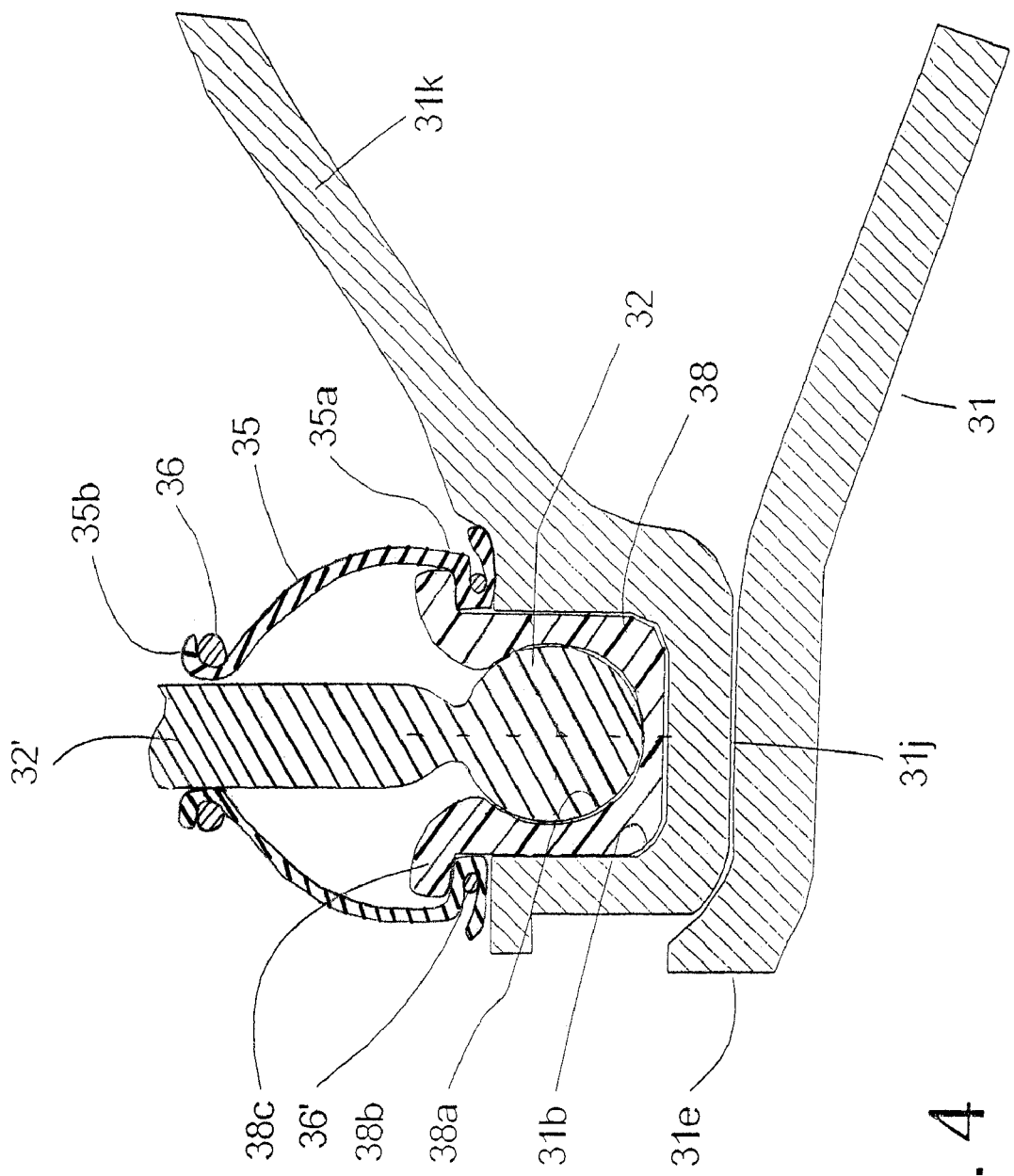
FIG. 4 is a cross-sectional view of a fourth possible embodiment of a rocker pendulum according to the present invention.

FIG. 4 shows the cross section of a fourth possible embodiment of the rocker pendulum according to the present invention, where the basic body 31 does not form itself the bearing shell, but only has a pot-shaped recess 31b, into which a bearing shell part 38 is inserted. The bearing shell part 38 may either be locked in the recess 31b and/or bonded into same and/or welded to the basic body 31. The bearing shell part 38 may be made of an especially flexible material. It is possible as a result for the bearing shell part 38 to extend by more than 180° around the ball 32. The bearing shell part 38 has collar-like projections 38c, which form a ring-shaped groove together with the outer wall of the basic body 31, and a sealing bellows 35 is inserted into and fastened in the said ring-shaped groove. As an additional securing measure, a straining ring 36' may secure this end 35a against unintended loosening from the basic body or the bearing shell. The sealing bellows is sealingly in contact by its other end 35b with the ball pivot 32', the necessary pressing force being ensured by a straining ring 36.

The embodiments shown in the figures represent only a few possible embodiments, which make use of the idea of the present invention. Any type of embodiment of the basic body, of the bulging of the end area of the basic body as well as of the bulging of the bearing shell is conceivable, in principle. The fastening of the sealing bellows as well as of the bearing shell is also selected only as an example, e.g., in FIG. 4. The bearing shell itself may have any desired shape, and its shape depends essentially on the mechanical stresses of the ball and socket joint and the rocker pendulum.

While a specific embodiment of the invention has been shown and described in detail to illustrate the application of the principles of the invention, it will be understood that the invention may be embodied otherwise without departing from such principles.

What is claimed is:

1. A rocker pendulum for a motor vehicle, the rocker pendulum comprising:
    a ball pivot comprising a ball and a pivot pin;
    an elongated hollow basic body with a first wall portion with a bulge defining at least one bearing shell section with a bottom area and with an annular edge that forms a bearing shell or a bearing shell receiving portion of a ball and socket joint on an outer side of said wall portion, said wall portion having a contact surface on an inner side of said wall portion in a region of said bottom area, said basic body having an opposite wall portion with an outer surface and an inner surface, said inner surface facing said contact surface and abutting said contact surface, said bearing shell section having a concave recess defined by said annular edge, said bottom area closing said recess on one side, said first and opposite wall portions and said bulge being formed as a single, one-piece member, said ball of said ball pivot being pivotably arranged in said bulge.

2. A rocker pendulum in accordance with claim 1, further comprising:
    a bearing shell, wherein said bearing shell is inserted into said bearing shell receiving portion, said ball of said ball pivot being seated in said bearing shell, said bottom area of said first wall portion being arranged between said ball and said opposite wall portion in an axial direction of the ball and socket joint.

3. A rocker pendulum in accordance with claim 2, wherein said bearing shell is held in said bulge by means of a press fit.

4. A rocker pendulum in accordance with claim 2, wherein said bearing shell is bonded, beaded, welded or fastened by means of a securing ring or a snap connection in said bulge.

5. A rocker pendulum in accordance with claim 1, wherein said bulge is shell-shaped.

6. A rocker pendulum in accordance with claim 2, wherein said wall portion and said opposite wall portion are part of a tubular section of said basic body.

7. A rocker pendulum in accordance with claim 6, wherein said inner surface facing said contact surface and abutting said contact surface are at an end section of said tubular section, with said end section having a diameter smaller than an adjacent middle section of said tubular section of said basic body.

8. A rocker pendulum in accordance with claim 7, wherein said tubular section of said basic body is hollow and essentially round in cross section.

9. A rocker pendulum in accordance with claim 7, wherein:
    said bearing shell receiving portion is a pot shaped recess; and
    said bearing shell has a collar projection cooperating with said first wall portion with said bulge defining at least one said bearing shell section to form a ring shaped groove.

10. A rocker pendulum in accordance with claim 2, wherein:
    said bearing shell receiving portion is a pot shaped recess;
    said bearing shell has a collar projection cooperating with said bearing shell section to form a ring shaped groove; and
    a sealing bellows has a portion inserted into said groove and a portion fastened in sealing contact with said ball pivot.

11. A rocker pendulum in accordance with claim 2, wherein:
    said bearing shell section and said contact surface are on opposite sides of said first wall portion with a bulge.

12. A rocker pendulum in accordance with claim 10, wherein said basic body is an injection molded part made of plastic.

13. A rocker pendulum in accordance with claim 2, wherein said bearing shell receiving portion has an opening defined by said annular edge, said opening being opposite said bottom area, said ball pivot extending through said opening.

14. A rocker pendulum in accordance with claim 1, wherein said bearing shell section is an end area of said basic body.

15. A rocker pendulum in accordance with claim 1, wherein said basic body is an injection molded part made of plastic.

16. A rocker pendulum in accordance with claim 1, wherein said basic body is manufactured according to an extrusion blow molding process.

17. A rocker pendulum in accordance with claim 1, wherein said first wall portion with said bulge and said opposite wall portion of said basic body comprises two components, one of which forms a core and the other component a jacket surface.

18. A rocker pendulum in accordance with claim 17, wherein said component forming said core is made of a fiber-reinforced material, and the jacket component is made of a softer material.

19. A rocker pendulum in accordance with claim 1, wherein the material of the area of the basic body forming the bearing shell section is reinforced by embedded fibers or by webs.

20. A rocker pendulum in accordance with claim 1, wherein a sealing bellows sealingly surrounds the ball and socket joint, wherein said sealing bellows is fastened to said basic body or said bearing shell by means of a locking connection.

21. A rocker pendulum for a motor vehicle, the rocker pendulum comprising:
    an elongated hollow basic body with a first wall portion with a bulge defining at least one bearing shell section with a bottom area and with an annular edge that forms a bearing shell or a bearing shell receiving portion of a ball and socket joint on an outer side of said wall portion, said wall portion having a contact surface on an inner side of said wall portion in a region of said bottom area, said basic body having an opposite wall portion with an outer surface and an inner surface, said inner surface facing said contact surface and abutting said contact surface, said bearing shell section having a concave recess defined by said annular edge, said bottom area closing said recess on one side;
    a ball pivot comprising a ball and a pivot pin; and
    a bearing shell, wherein said bearing shell is inserted into said bearing shell receiving portion, said ball of said ball pivot being seated in said bearing shell, said bottom area of said first wall portion being arranged between said ball and said opposite wall portion in an axial direction of the ball and socket joint, said bearing shell being held in said bulge by means of a press fit.

22. A rocker pendulum for a motor vehicle, the rocker pendulum comprising:

an elongated hollow basic body with a first wall portion with a bulge defining at least one bearing shell section with a bottom area and with an annular edge that forms a bearing shell or a bearing shell receiving portion of a ball and socket joint on an outer side of said wall portion, said wall portion having a contact surface on an inner side of said wall portion in a region of said bottom area, said basic body having an opposite wall portion with an outer surface and an inner surface, said inner surface facing said contact surface and abutting said contact surface, said bearing shell section having a concave recess defined by said annular edge, said bottom area closing said recess on one side;

a ball pivot comprising a ball and a pivot pin; and a bearing shell, wherein said bearing shell is inserted into said bearing shell receiving portion, said ball of said ball pivot being seated in said bearing shell, said bottom area of said first wall portion being arranged between said ball and said opposite wall portion in an axial direction of the ball and socket joint, said bearing shell being bonded, beaded, welded or fastened by means of a securing ring or a snap connection in said bulge.

* * * * *

UNITED STATES PATENT AND TRADEMARK OFFICE
CERTIFICATE OF CORRECTION

PATENT NO. : 7,331,733 B2
APPLICATION NO. : 10/895147
DATED : February 19, 2008
INVENTOR(S) : Wolf et al.

It is certified that error appears in the above-identified patent and that said Letters Patent is hereby corrected as shown below:

Title Page item 73 should read
Item (73)    Assignee:    ZF Lemförder Metallwaren AG,
                          Stemwede-Dielinger (DE)

Signed and Sealed this

Ninth Day of June, 2009

JOHN DOLL
*Acting Director of the United States Patent and Trademark Office*